US012395437B2

(12) United States Patent
Keung et al.

(10) Patent No.: US 12,395,437 B2
(45) Date of Patent: Aug. 19, 2025

(54) APPARATUS AND METHOD FOR MANAGING NETWORK FLOW CONGESTION

(71) Applicant: Realtek Singapore Private Limited, Singapore (SG)

(72) Inventors: Donggun Keung, San Jose, CA (US); Charles Chen, San Jose, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 351 days.

(21) Appl. No.: 17/979,948

(22) Filed: Nov. 3, 2022

(65) Prior Publication Data

US 2023/0269187 A1 Aug. 24, 2023

Related U.S. Application Data

(63) Continuation-in-part of application No. 17/676,932, filed on Feb. 22, 2022, now abandoned.

(51) Int. Cl.
*H04L 47/129* (2022.01)
*H04L 47/19* (2022.01)

(52) U.S. Cl.
CPC .......... *H04L 47/129* (2022.05); *H04L 47/196* (2013.01)

(58) Field of Classification Search
CPC ............................ H04L 47/129; H04L 47/196
See application file for complete search history.

(56) References Cited

U.S. PATENT DOCUMENTS 8,433,808 B1 * 4/2013 Hong ...................... H04L 67/02 709/228
9,391,911 B1 * 7/2016 Anderson ............. H04L 1/1621
11,115,385 B1 * 9/2021 Patel ................... H04L 63/0236
2006/0176810 A1 * 8/2006 Kekki ..................... H04W 8/04 370/229
2007/0091900 A1 * 4/2007 Asthana ................ H04W 28/02 370/395.42
2010/0246400 A1 * 9/2010 Onishi .................. H04L 47/193 370/235

(Continued)

FOREIGN PATENT DOCUMENTS

CN 103297346 A 9/2013

OTHER PUBLICATIONS

BBR Congestion Control draft-cardwell-iccrg-bbr-congestion-control-00; Jul. 3, 2017.

(Continued)

*Primary Examiner* — Melanie Jagannathan
(74) *Attorney, Agent, or Firm* — McClure, Qualey & Rodack, LLP

(57) ABSTRACT

An apparatus and a method for managing network flow congestion are provided. The method for managing network flow congestion includes: receiving a plurality of packets; identifying whether each packet belongs to a predetermined protocol; distinguishing a plurality of connections of the packets belonged to the predetermined protocol; monitoring a buffer usage of each different connections; and performing a congestion check procedure on the currently monitored connection. In the congestion check procedure, when the buffer usage of the currently monitored connection exceeds a threshold, a congestion processing procedure is triggered.

17 Claims, 7 Drawing Sheets

(56) References Cited

U.S. PATENT DOCUMENTS

| | | | | |
|---|---|---|---|---|
| 2014/0126357 | A1* | 5/2014 | Kulkarni | H04L 47/193 370/230 |
| 2014/0164641 | A1* | 6/2014 | Ye | H04L 47/127 709/235 |
| 2018/0139131 | A1* | 5/2018 | Ignatchenko | H04L 47/32 |
| 2019/0222523 | A1 | 7/2019 | Toy | |
| 2019/0253364 | A1* | 8/2019 | Li | H04L 47/2441 |
| 2021/0144161 | A1* | 5/2021 | Mittal | H04L 63/0236 |
| 2021/0344603 | A1 | 11/2021 | Ramachandran et al. | |

OTHER PUBLICATIONS

IEEE Standard for Local and metropolitan area networks—Bridges and Bridged Networks; 2014 (relevant sections 6.5.9, 6.9.3, 8.6.7, and 1.2).

TCP Congestion Control; Sep. 2009.

Data Center TCP (DCTCP): TCP Congestion Control for Data Centers; Oct. 2017.

* cited by examiner

44

| Flow identifier | Network flow information | Buffer usage | Number of discarded packets | Number of marked packets | Number of transmitted packets | Monitoring period length |
|---|---|---|---|---|---|---|
| | | | | | | |
| | | | | | | |

FIG. 5

APPARATUS AND METHOD FOR MANAGING NETWORK FLOW CONGESTION

CROSS-REFERENCE TO RELATED APPLICATIONS

This application is a continuation-in-part application claiming benefits of U.S. application Ser. No. 17/676,932 filed on 2022 Feb. 22 (now abandoned), which is hereby incorporated by reference in their entirety.

BACKGROUND

Technical Field

The present disclosure relates to a network transmission technology, and in particular, to an apparatus and a method for managing network flow congestion.

Related Art

In a residential gateway (RG), there are, typically, one or more local area network (LAN) ports and a single wide area network (WAN) port. All internet access traffic will need to go through the WAN port which is connected to service provider (ISP) edge router.

In a typical RG setup, many LAN side hosts can be connected to the RG (laptops, smart TVs, smart phones, tablets, IoTs). The RG should be designed to forward traffic with low latency and high throughput for all active TCP connections going through it. Many of the LAN side hosts connected to the RG will issue transmission requests to the RG in parallel. Typically, the size of packet transmitted is relatively small (less than 1518 bytes). The packet buffers available in the RG is typically limited (less than 1 gigabytes), due to cost concern. The WAN port on RG can become the bottleneck link in this case. The combination of many transmission requests from LAN side hosts and limited packet buffers (in a typical RG, the size of packet buffer is fixed) may increase traffic latency, packet drop probability and cause collapse of effective traffic throughput in RG. This is the TCP INCAST problem mentioned in RFC 8257 document.

To fully utilize the available network capacity, current TCP congestion avoidance strategies (for example TCP RENO, TCP TAHOE, TCP CUBIC) require each TCP sender to increase its congestion window size (slow start then congestion avoidance phase) until packets are dropped (detected by TCP timeouts, missing or duplicated TCP ACKs) (RFC 5681 document). In case where WAN port of RG becomes the bottleneck link, increasing TCP congestion window size will not increase actual TCP throughput due to increase in packet retransmission. For some TCP connections, TCP timeout could be in the range of hundreds of milliseconds. Some of the in-flight packets in the TCP pipeline may need to be retransmitted in case of packet dropped or timed-out, causing high traffic latency, low effective throughput, and bandwidth utilization.

TCP flows are independent data flows, and each TCP flow will try to increase its transmission rate and congestion window size to fill up the TCP pipeline between sender and receiver. The limited buffers in the RG will likely to be occupied by the first TCP flow setup over the RG. An intelligent buffer allocation scheme will be required on the RG to ensure packet buffers are allocated fairly among all active TCP connections to provide reasonable latency and throughput performance for all active TCP connections going through the RG.

SUMMARY

An embodiment of the present disclosure provides a method for managing network flow congestion, including: receiving a plurality of packets; identifying whether each packet belongs to a predetermined protocol; distinguishing a plurality of connections of the packets belonged to the predetermined protocol; monitoring a buffer usage of each different connections; and performing a congestion check procedure on the currently monitored connection. In the congestion check procedure, when the buffer usage of the currently monitored connection exceeds a threshold, a congestion processing procedure is triggered.

An embodiment of the present disclosure provides an apparatus for managing network flow congestion, including: a receive port, a buffer pool, a management circuit, and an output port. The receive port is configured to receive a plurality of packets. The buffer pool is configured to store the packets. The management circuit is configured to identify whether each packet belongs to a predetermined protocol, distinguish a plurality of connections of the packets belonged to the predetermined protocol, monitor a buffer usage of each different connections of the packets belonged to the predetermined protocol, and perform a congestion check procedure on the currently monitored connection. In the congestion check procedure, when the buffer usage of the currently monitored connection exceeds a threshold, a congestion processing procedure is triggered. The output port is configured to output the packets stored in the buffers.

According to the apparatus and the method for managing network flow congestion in some embodiments of the present disclosure, buffer resources can be fairly allocated to each network flow, and a transmission queue can be prevented from being excessively long, which not only can prevent the buffer resources from being occupied by network flows with heavy traffic, but also can reduce traffic delays and the number of packet retransmissions.

BRIEF DESCRIPTION OF THE DRAWINGS

FIG. 5 is a schematic diagram of a congestion management table according to an embodiment of the present disclosure.

DETAILED DESCRIPTION

Figure 1:
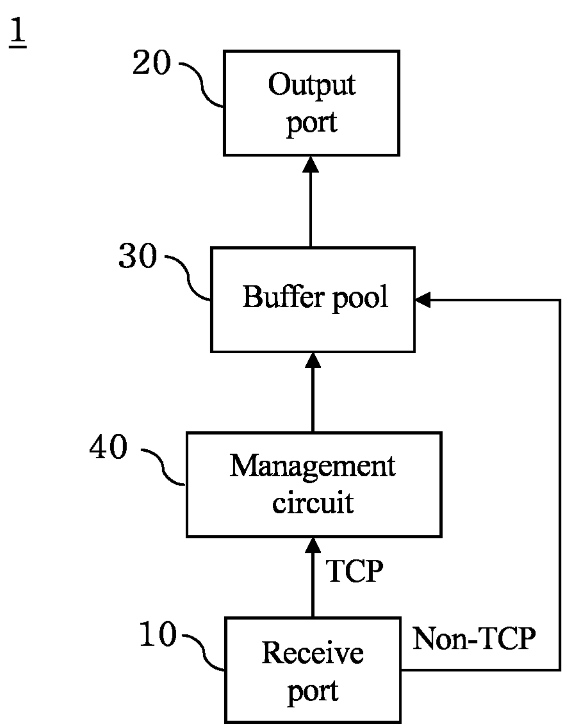
FIG. 1 is a schematic diagram of an apparatus for managing network flow congestion according to an embodiment of the present disclosure.

FIG. 1 is a schematic diagram of an apparatus 1 for managing network flow congestion according to an embodiment of the present disclosure. The apparatus for managing network flow congestion includes a receive port 10, an output port 20, a buffer pool 30, and a management circuit 40. The buffer pool 30 includes a plurality of buffers (not shown in the figure) to buffer packets. The buffer pool 30 is located in a transitory memory. The transitory memory may be a transitory computer-readable medium, such as a static random access memory (SRAM) or a dynamic random access memory (DRAM). Herein, an example in which the number of the receive ports 10 and the number of the output ports 20 are both one is used, but the present disclosure is not limited to the number. The number of the receive ports 10 may be one or more, and the number of the output ports 20 may also be one or more, which can be appropriately adjusted depending on actual application requirements.

Figure 2:
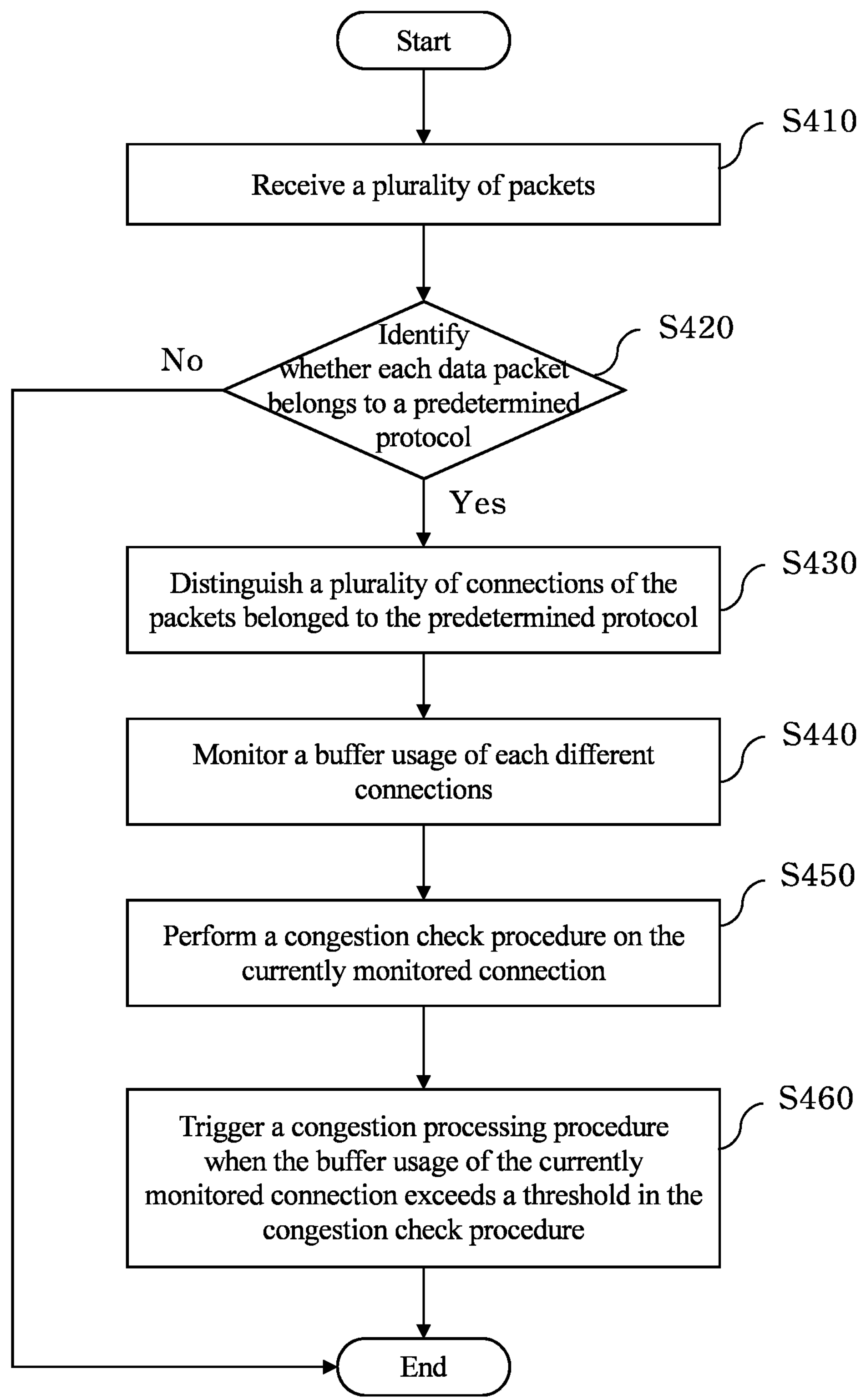
FIG. 2 is a flowchart of a method for managing network flow congestion according to an embodiment of the present disclosure.

The management circuit 40 performs a method for managing network flow congestion, to manage resource allocation of the buffers in the buffer pool 30. FIG. 2 is a flowchart of a method for managing network flow congestion according to an embodiment of the present disclosure. First, in step S410, a plurality of packets is received from the receive ports. Next, go to step S420 to identify whether each packet belongs to a predetermined protocol. Herein, the predetermined protocol is a transmission control protocol (TCP). If a packet belongs to the predetermined protocol (for example, TCP), go to step S430 to distinguish a connection of the packet belonged to the predetermined protocol. In step S440, a buffer usage of each different connection and a total buffer usage are monitored. In step S450, a congestion check procedure is performed on the currently monitored connection. In step S460, in the congestion check procedure, when the buffer usage of the currently monitored connection exceeds a threshold, a congestion processing procedure is triggered. The congestion processing procedure is used for alleviating the congestion (details will be described later). In this way, the management circuit 40 can individually confirm whether excessive buffers are occupied for a network flow of each connection, to fairly allocate buffer resources. If the packet does not belong to the predetermined protocol, the steps S430-S460 are not performed, that is, the packet is directly passed to be stored in the buffer pool 30 to wait for output (as shown in FIG. 1).

Figure 3:
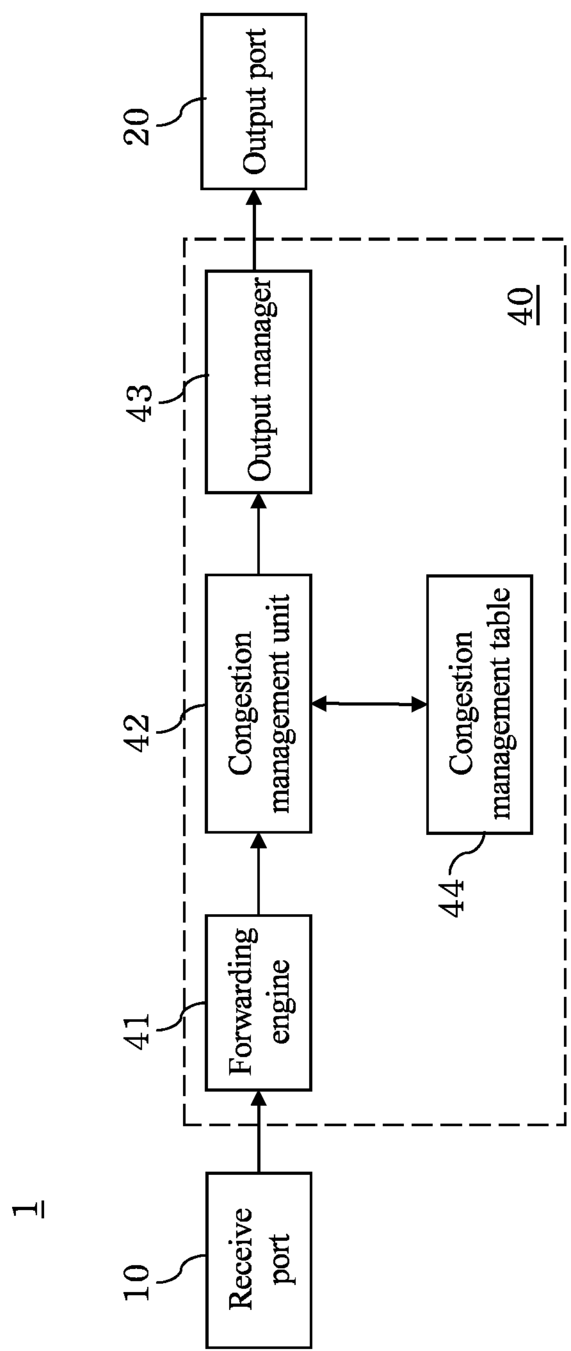
FIG. 3 is a detailed flowchart of a buffer management method according to an embodiment of the present disclosure.

FIG. 3 is a detailed schematic diagram of the apparatus 1 for managing network flow congestion according to an embodiment of the present disclosure. Herein, for ease of viewing, the foregoing buffer pool 30 is omitted. The management circuit 40 includes a forwarding engine 41, a congestion management unit 42, an output manager 43, and a congestion management table 44. The forwarding engine 41, the congestion management unit 42, and the output manager 43 may be implemented through a microprocessor, a complex programmable logic device (CPLD), a field-programmable gate array (FPGA), a logic circuit, an analog circuit, a digital circuit, and/or any processing element that operates signals (analog and/or digital) based on operating instructions. The congestion management table 44 may be stored in a transitory memory or a non-transitory memory. The congestion management table 44 may be built in the congestion management unit 42 or externally connected to the congestion management unit 42.

The forwarding engine 41 receives a packet from the receive port 10, extracts header information of the packet, and stores the header information to a metadata block associated with the packet. The forwarding engine 41 further makes a forwarding decision according to the packet and the header information, that is, decides whether to forward the packet. If the forwarding is accepted, the packet is sent to the congestion management unit 42 along with the metadata block associated with the packet. The congestion management unit 42 is configured to perform the method for managing network flow congestion. The output manager 43 puts the packet in a transmission queue, and schedules to transmit the packet in the transmission queue to the output port 20 to send out the packet. The transmission queue is composed of the buffers in the buffer pool 30.

Figure 4:
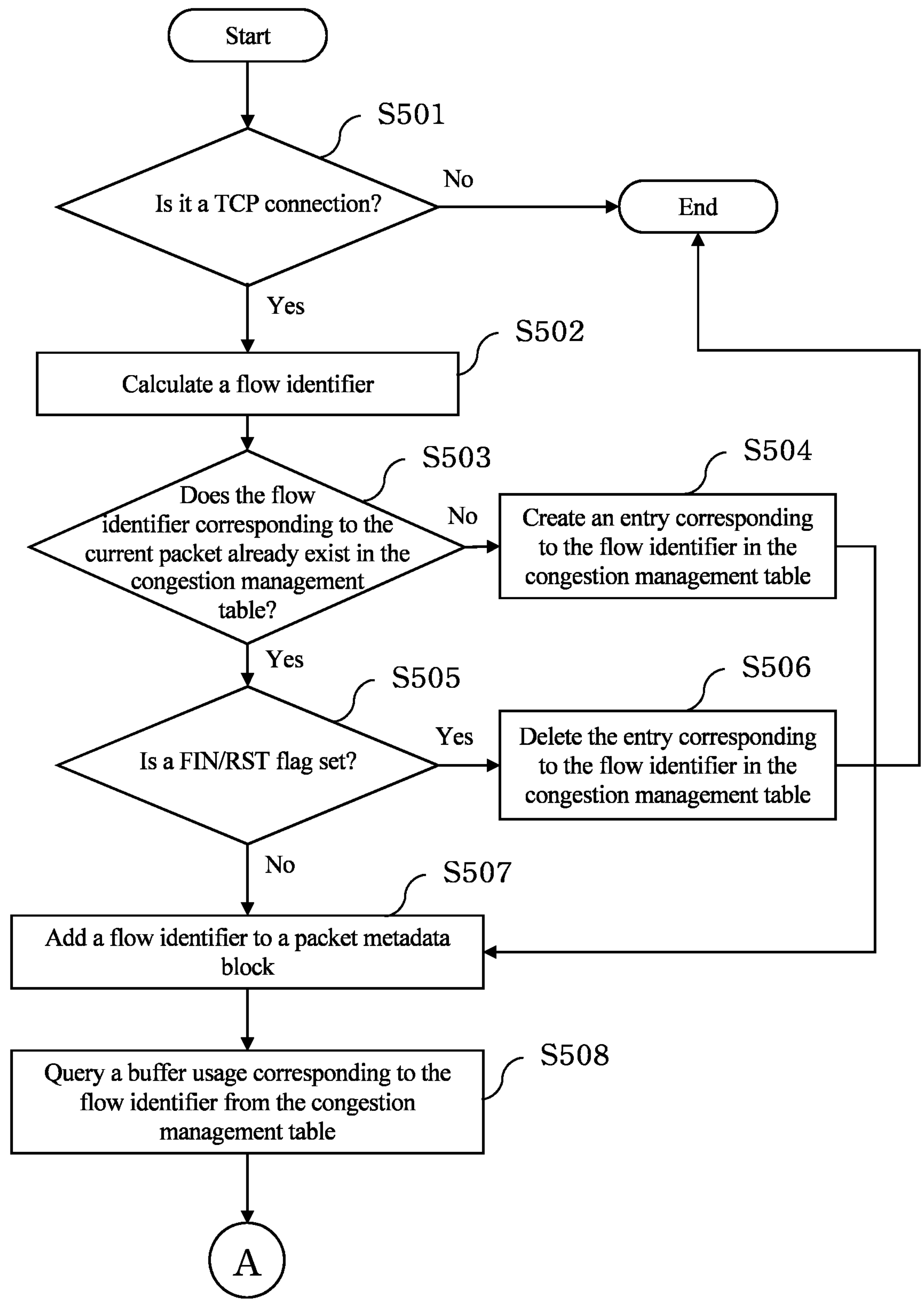
FIG. 4 is a detailed flowchart (1) of the method for managing network flow congestion according to an embodiment of the present disclosure.

FIG. 4 is a detailed flowchart (1) of the method for managing network flow congestion according to an embodiment of the present disclosure. After a packet (hereinafter referred to as a current packet, that is, a packet of the currently monitored connection) and an associated metadata block are obtained through the forwarding engine 41, first, whether the current packet belongs to the monitored protocol type is confirmed (step S501). If the current packet does not belong to the monitored protocol type, congestion management is not required, and the process ends. If the current packet belongs to the monitored protocol type, go to step S502 to calculate a flow identifier. Herein, the flow identifier is based on a source IP, a destination IP, an IP protocol, a source port, and a destination port. In some embodiments, a hash value is calculated as the flow identifier according to the source IP, the destination IP, the IP protocol, the source port, and the destination port, for example, calculated using the SHA256 algorithm. According to different flow identifiers, corresponding connections (network flows) may be distinguished to be different, that is, at least one of the source IP, the destination IP, the IP protocol, the source port, and the destination port is different. Next, go to step S503 to confirm whether the flow identifier corresponding to the current packet calculated in step S502 already exists in the congestion management table 44. If not, it indicates that the current packet belongs to a new network flow, and therefore an entry corresponding to the flow identifier is created in the congestion management table 44.

FIG. 5 is a schematic diagram of the congestion management table 44 according to an embodiment of the present disclosure. The flow identifier may be used as a key. Each entry records a plurality of parameters corresponding to the flow identifier. The parameters may include but are not limited to network flow information, a buffer usage, the number of dropped packets, the number of marked packets, the number of transmitted packets, and a monitoring period length. The network flow information includes the foregoing source IP, destination IP, IP protocol, source port, and destination port. The buffer usage is the number of buffers occupied by the network flow. The number of dropped packets is the number of packets of the network flow that are dropped. The number of marked packets is the number of packets of the network flow that are marked (which will be further described later). The number of transmitted packets is the number of packets of the network flow that are sent out by the apparatus 1 for managing network flow congestion. The monitoring period length is a persistence duration of the entry since the entry was created. Specifically, each entry corresponds to one persistence counter, which is decremented during the persistence duration. When the persistence counter returns to zero, the corresponding entry is deleted from the congestion management table 44. Alternatively, when the persistence counter returns to zero, the persistence counter is reset to a preset value and continues to be decremented; and after the persistence counter returns to zero for a specific number of times, the corresponding entry is deleted from the congestion management table 44. In this way, entries that remain idle (have no traffic) for a long time can be removed.

Referring to FIG. 4 again, after the entry is created in step S504, go to step S507 to add a flow identifier to the packet metadata block. If it is determined in step S503 that the flow identifier already exists in the congestion management table 44, go to step S505. In step S505, whether a FIN (Finish sending data) flag or a RST (Reset) flag of the current packet is set is determined. If the FIN flag or the RST flag is set, it indicates that the connection needs to be reset or closed. Therefore, there is no need to continue monitoring the network flow, and the process goes to step S506. In step S506, the entry corresponding to the flow identifier in the congestion management table 44 is deleted, the monitoring of the buffer usage corresponding to the connection is canceled, and then the process ends. If neither the FIN flag or the RST flag is set, go to step S507 to add a flow identifier to the packet metadata block. After step S507, a buffer usage corresponding to the flow identifier can be queried from the congestion management table 44 (step S508).

Figure 6:
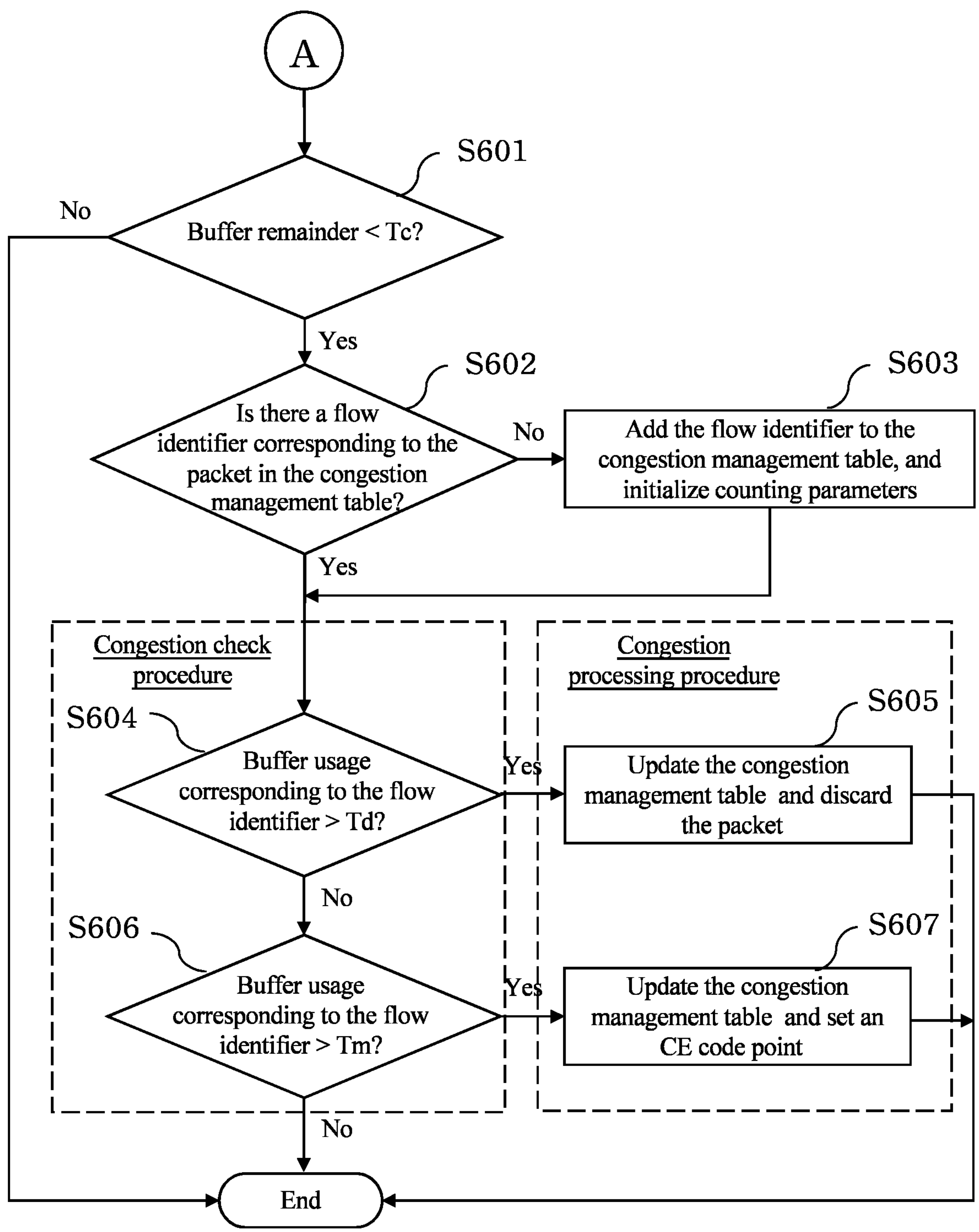
FIG. 6 is a detailed flowchart (2) of the method for managing network flow congestion according to an embodiment of the present disclosure.

FIG. 6 is a detailed flowchart (2) of the method for managing network flow congestion according to an embodiment of the present disclosure. After step S508, it is determined whether to perform the congestion check procedure according to a remainder of the buffer corresponding to the currently monitored connection and a congestion indication threshold Tc. Specifically, in step S601, whether a remainder of all the buffers of the apparatus 1 for managing network flow congestion is less than the congestion indication threshold Tc is confirmed. If yes, it indicates that congestion occurs and the congestion check procedure needs to be performed, and the process goes to step S602. If not, it indicates that no congestion occurs, and the packet can be normally transmitted. After the number of transmitted packets corresponding to the flow identifier in the congestion management table 44 is added by one, the process ends. In step S602, first, whether there is a flow identifier corresponding to the current packet in the congestion management table 44 is confirmed. If not, it indicates that the current packet belongs to a new network flow. Therefore, the flow identifier is added to the congestion management table 44, and counting parameters related to the parameters of the buffer usage, the number of dropped packets, the number of marked packets, the number of transmitted packets, and the monitoring period length are initialized. If it is confirmed in step S602 that there is a flow identifier corresponding to the current packet in the congestion management table 44, or after step S603 is performed to add the flow identifier to the congestion management table 44, go to step S604.

In step S604, a buffer usage corresponding to the flow identifier, that is, a buffer usage of the currently monitored connection, is queried from the congestion management table 44. If the buffer usage is greater than a drop threshold Td, go to step S605 to drop the packet and update the congestion management table 44. Herein, the update of the congestion management table 44 is to add one to the number of dropped packets corresponding to the flow identifier in the congestion management table 44.

If it is determined in step S604 that the buffer usage is not greater than the drop threshold Td, go to step S606. In step S606, whether the buffer usage corresponding to the flow identifier (i.e., the buffer usage of the currently monitored connection) is greater than a mark threshold Tm is determined. If yes, it indicates that the buffer usage reaches a level at which congestion may be caused, and the process goes to step S607. In step S607, an IP ECN (Explicit Congestion Notification) field in the current packet is set to CE (Congestion Experienced) code point and the congestion management table 44 is updated. In addition, since the CE code point is set, an IP header checksum of the current packet needs to be recalculated. In this way, a receive end of the packet set an ECE flag to a TCP ACK packet and sends the TCP ACK packet back to a transmit end, so that the transmit end can learn the congestion based on the ECE flag, and learn that a sending rate needs to be limited (for example, by reducing the size of a TCP congestion window). Herein, the update of the congestion management table 44 is to add one to the number of marked packets and the number of transmitted packets corresponding to the flow identifier in the congestion management table 44.

The congestion indication threshold Tc is a threshold for the number of buffers that is available, and the drop threshold Td and the mark threshold Tm are thresholds for the number of buffers that are consumed. In some embodiments, the congestion indication threshold Tc is 10% to 15% of the total number of buffers; the drop threshold Td is 85% to 90%; and the mark threshold Tm is 75% to 85%.

In some embodiments, the mark threshold Tm can be dynamically adjusted according to the number of flow identifiers in the congestion management table 44, that is, the number of connections. The adjustment manner may be to reduce the mark threshold Tm as the number of connections increases. In this way, buffer resources can be allocated more fairly.

In some embodiments, if the monitoring period length exceeds a predetermined value, the entry corresponding to the flow identifier in the congestion management table 44 can be deleted autonomously, and the monitoring of the buffer usage corresponding to the connection can be canceled, to avoid occupation of storage resources. Specifically, each entry corresponds to one persistence counter, which is decremented during the persistence duration. When the persistence counter returns to zero, the corresponding entry is deleted from the congestion management table 44. Alternatively, when the persistence counter returns to zero, the persistence counter is reset to a preset value and continues to be decremented; and after the persistence counter returns to zero for a specific number of times, the corresponding entry is deleted from the congestion management table 44. In this way, entries that remain idle (have no traffic) for a long time can be removed.

Figure 7:
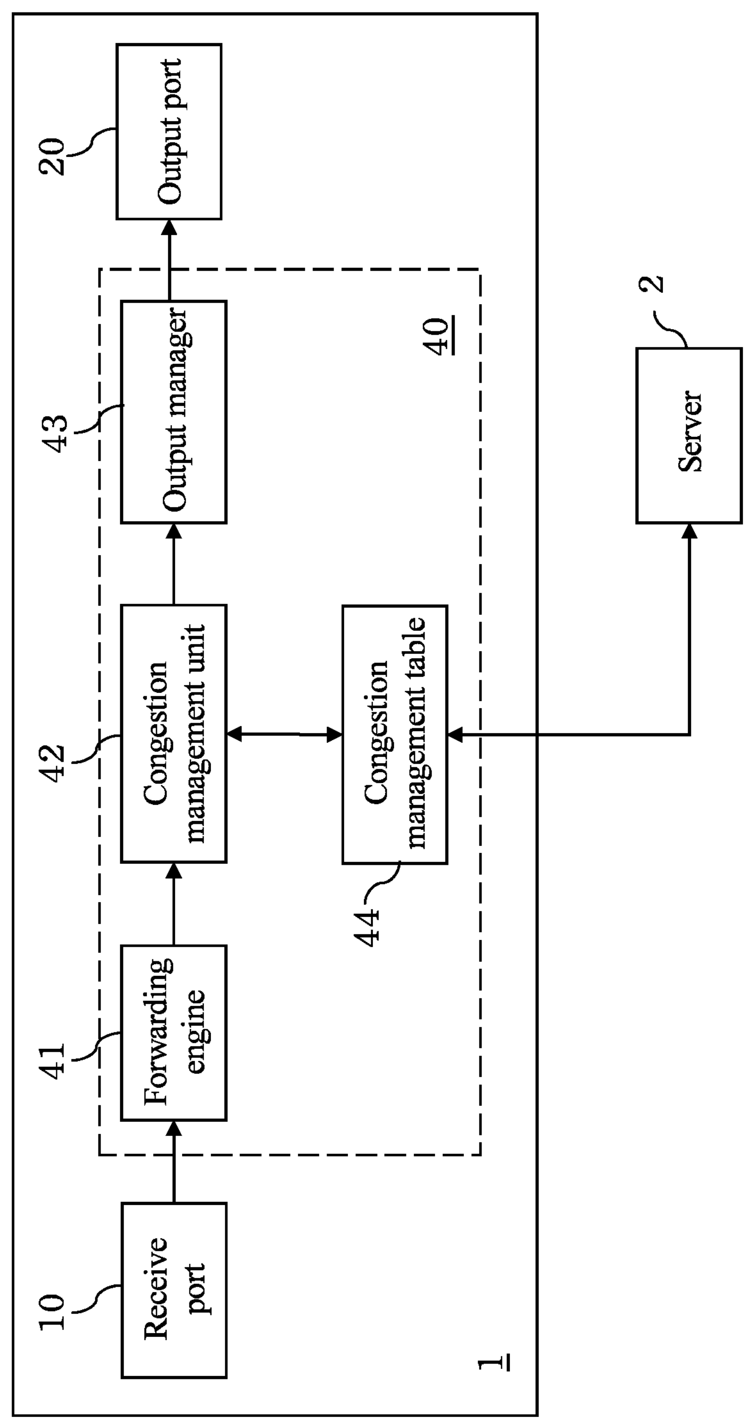
FIG. 7 is another schematic diagram of the apparatus for managing network flow congestion according to an embodiment of the present disclosure.

FIG. 7 is another schematic diagram of the apparatus 1 for managing network flow congestion according to an embodiment of the present disclosure. The apparatus 1 for managing network flow congestion may also upload the congestion management table 44 to a server 2. The server 2 may be loaded with an artificial intelligence algorithm. The server 2 uses the parameters in the congestion management table 44 as input data, then predicts a preferable optimal drop threshold Td and a preferable optimal mark threshold Tm, and returns the preferable optimal drop threshold Td and the preferable optimal mark threshold Tm to the apparatus 1 for managing network flow congestion for setting. In other words, after the foregoing step S440, a flow data collection step is further performed to upload the congestion management table 44 to the server 2, and the server 2 performs parameter optimization to derive the best threshold values for the congestion management unit 42 and the threshold values can be updated by server 2 over the management network path.

For best TCP throughput and latency performance, the apparatus 1 according to this disclosure has the following performance characteristic:

Egress queue for each TCP flow should be short enough such that it does not impose excessive latency on traffic.

Egress queue for each TCP flow should be long enough to absorb limited bursts without excessive packet loss.

Egress queue for each TCP flow should be long enough to saturate the WAN side bandwidth capacity. The WAN port transmission capacity should be fully utilized.

Packet buffers in the system should be allocated fairly such that no one TCP flow should consume all (or most) of the available buffers, starving the other TCP flows going through the apparatus 1.

In some embodiments, the apparatus 1 for managing network flow congestion is a network device such as a gateway, a network modem, a router, or a wireless network access point.

In some embodiments, the apparatus 1 has a plurality of local area network (LAN) ports and a single wide area network (WAN) port. All internet access traffic will need to go through the WAN port which is connected to service provider (ISP) edge router. Each of the LAN ports receives an independent data flows.

To sum up, according to the apparatus 1 and the method for managing network flow congestion provided in some embodiments of the present disclosure, buffer resources can be fairly allocated to each network flow, and a transmission queue can be prevented from being excessively long, which not only can prevent the buffer resources from being occupied by network flows with heavy traffic, but also can reduce traffic delays and the number of packet retransmissions.

What is claimed is:

1. A method for managing network flow congestion, comprising:

- receiving a plurality of packets;
- identifying whether each packet belongs to a transmission control protocol (TCP);
- distinguishing a plurality of connections of the packets belonged to the transmission control protocol;
- monitoring a buffer usage of each different connections; and
- performing a congestion check procedure on the currently monitored connection, wherein in the congestion check procedure, when the buffer usage of the currently monitored connection exceeds a threshold, a congestion processing procedure is triggered;
- wherein the packet, which does not belong to the transmission control protocol, is directly passed to be stored in a buffer pool to wait for output.

2. The method for managing network flow congestion according to claim 1, further comprising

- determining whether to perform the congestion check procedure according to a remainder of the buffer corresponding to the currently monitored connection and a congestion indication threshold.

3. The method for managing network flow congestion according to claim 1, wherein the threshold is a mark threshold, and the congestion processing procedure is to set a CE (Congestion Experienced) code point in the packet corresponding to the currently monitored connection.

4. The method for managing network flow congestion according to claim 3, wherein an ECE flag is set to a TCP ACK packet and the TCP ACK packet is sent back to a transmit end.

5. The method for managing network flow congestion according to claim 4, wherein a size of a congestion window in the transmit end is reduced according to the ECE flag of the TCP ACK packet.

6. The method for managing network flow congestion according to claim 3, wherein the mark threshold is dynamically reduced as the number of connections increases.

7. The method for managing network flow congestion according to claim 1, wherein the threshold is a drop threshold, and the congestion processing procedure is to drop the packet corresponding to the currently monitored connection.

8. The method for managing network flow congestion according to claim 1, further comprising:

- checking a FIN flag and a RST flag of each of the packets, and canceling the monitoring of the buffer usage corresponding to the connection when the FIN flag or the RST flag is set.

9. The method for managing network flow congestion according to claim 1, wherein the threshold is adjusted over a management network path.

10. An apparatus for managing network flow congestion, comprising:

- a receive port, configured to receive a plurality of packets;
- a buffer pool, configured to store the packets;
- a management circuit, configured to identify whether each packet belongs to a transmission control protocol (TCP), distinguish a plurality of connections of the packets belonged to the transmission control protocol, monitor a buffer usage of each different connections of the packets belonged to the transmission control protocol, and perform a congestion check procedure on the currently monitored connection, wherein in the congestion check procedure, when the buffer usage of the currently monitored connection exceeds a threshold, a congestion processing procedure is triggered; and
- an output port, configured to output the packets stored in the buffers;
- wherein the packet, which does not belong to the transmission control protocol, is directly passed to be stored in a buffer pool to wait for output.

11. The apparatus for managing network flow congestion according to claim 10, wherein the threshold is a mark threshold, and the congestion processing procedure is to set a CE (Congestion Experienced) code point in the packet corresponding to the currently monitored connection.

12. The apparatus for managing network flow congestion according to claim 11, wherein an ECE flag is set to a TCP ACK packet and the TCP ACK packet is sent back to a transmit end, and wherein the transmit end reduces a size of a congestion window according to the ECE flag of the TCP ACK packet.

13. The apparatus for managing network flow congestion according to claim 11, wherein the mark threshold is dynamically reduced as the number of connections increases.

14. The apparatus for managing network flow congestion according to claim 10, wherein the threshold is a drop threshold, and the congestion processing procedure is to drop the packet corresponding to the currently monitored connection.

15. The apparatus for managing network flow congestion according to claim 10, wherein the management circuit further determines whether to perform the congestion check procedure according to a buffer remainder corresponding to the currently monitored connection and a congestion indication threshold.

16. The apparatus for managing network flow congestion according to claim 10, wherein the management circuit further checks a FIN flag and a RST flag of each of the packets, and cancels the monitoring of the buffer usage corresponding to the connection when the FIN flag or the RST flag is set.

17. The apparatus for managing network flow congestion according to claim 10, wherein the threshold is adjusted over a management network path.

* * * * *